United States Patent [19]  
Burger et al.

[11] Patent Number: 4,635,194  
[45] Date of Patent: Jan. 6, 1987

[54] INSTRUCTION BUFFER BYPASS APPARATUS

[75] Inventors: Mark E. Burger; Steven L. George, both of Endicott; Chuck H. Ngai, Endwell, all of N.Y.

[73] Assignee: International Business Machines Corporation, Armonk, N.Y.

[21] Appl. No.: 490,813

[22] Filed: May 2, 1983

[51] Int. Cl.[4] .............................................. G06F 9/30
[52] U.S. Cl. .................................... 364/200; 364/900
[58] Field of Search ... 364/200 MS File, 900 MS File

[56] References Cited

U.S. PATENT DOCUMENTS

| | | | |
|---|---|---|---|
| 4,040,030 | 8/1977 | Cassonnet | 364/200 |
| 4,040,031 | 8/1977 | Cassonnet | 364/200 |
| 4,075,686 | 2/1978 | Calle et al. | 364/200 |
| 4,156,906 | 5/1979 | Ryan | 364/200 |
| 4,217,640 | 8/1980 | Porter et al. | 364/200 |
| 4,268,907 | 5/1981 | Porter et al. | 364/200 |
| 4,500,954 | 2/1985 | Duke et al. | 364/200 |

Primary Examiner—Gareth D. Shaw  
Assistant Examiner—Christina M. Eakman  
Attorney, Agent, or Firm—John H. Bouchard

[57] ABSTRACT

A bypass apparatus in a computer system is disclosed. The computer system includes a central storage facility for storing various instructions to be executed, an instruction register for storing an instruction being executed, and an instruction buffer, interconnected between the central storage facility and the instruction register, for temporarily storing the next instructions to be executed following execution of the instruction stored in the instruction register. A bypass path interconnects the central storage facility directly to the instruction register for bypassing the instruction buffer when certain special instructions being held in the instruction register are being executed, such as an EXECUTE instruction. Consequently, the contents of the instruction buffer are not lost or destroyed as a result of execution of the special instruction. The computer system further includes an execute register interconnected between the central storage facility and the instruction register for storing one or more bytes of the instruction being executed when the byte-length of the instruction is greater than the byte-length of the instruction register which stores said instruction.

4 Claims, 22 Drawing Figures

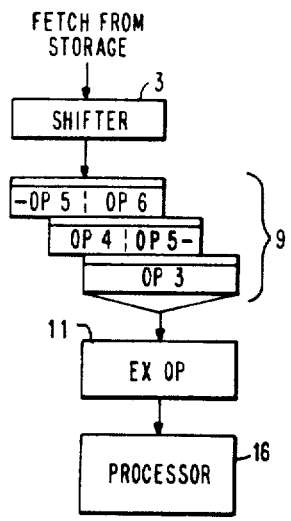
FIG. 3a
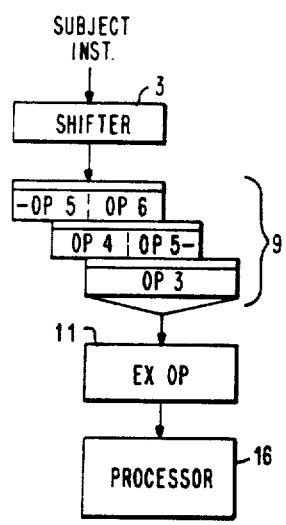
FIG. 3b
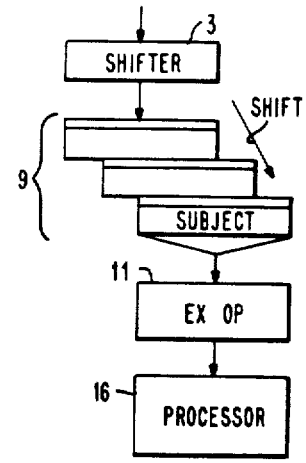
FIG. 3c
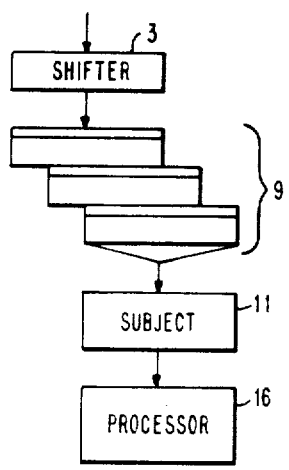
FIG. 3d
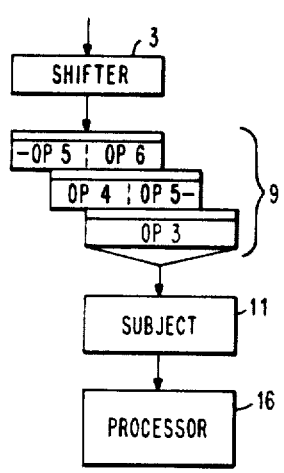
FIG. 3e
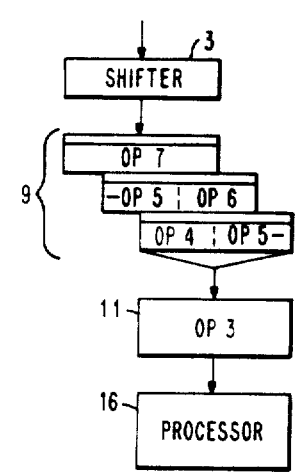
FIG. 3f
FIG. 3   PRIOR ART

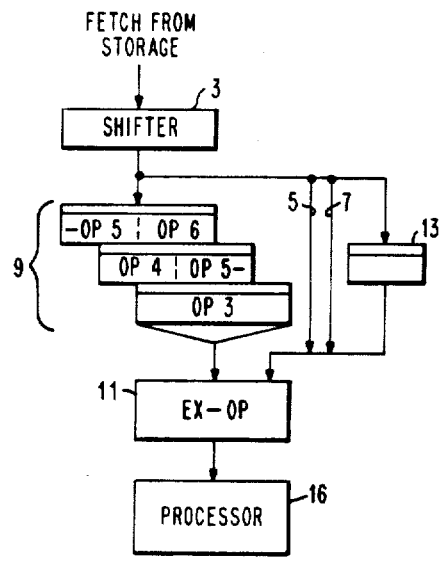
FIG. 4a
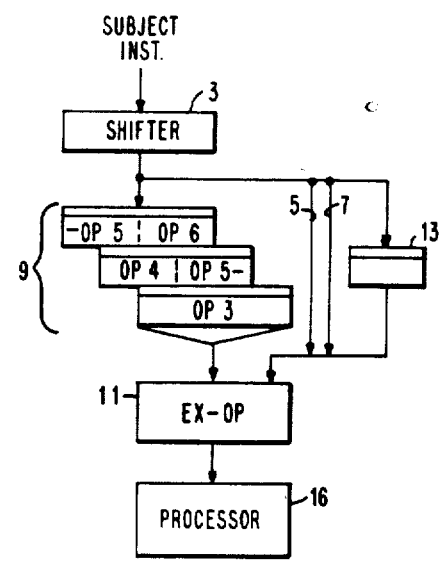
FIG. 4b
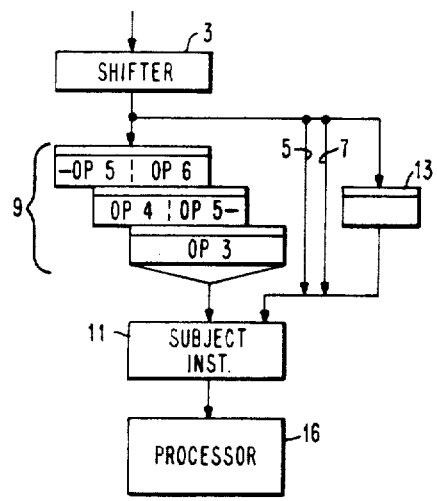
FIG. 4c
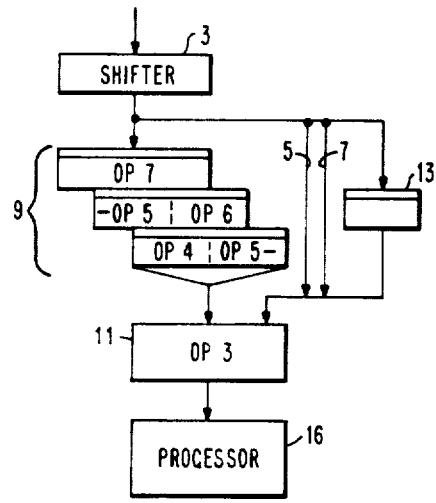
FIG. 4d
FIG. 4

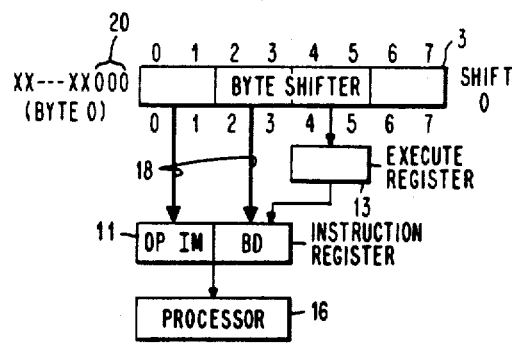
FIG. 5a
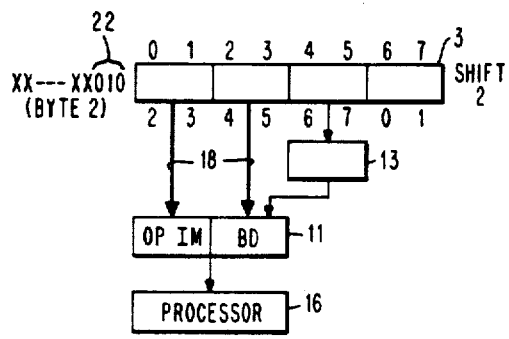
FIG. 5b
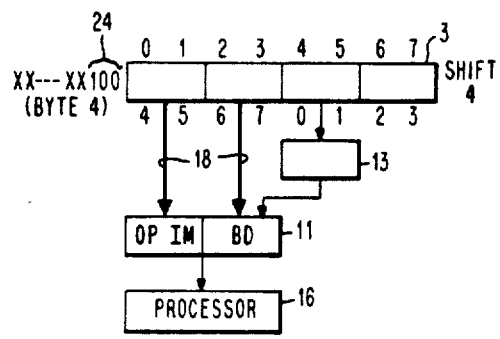
FIG. 5c
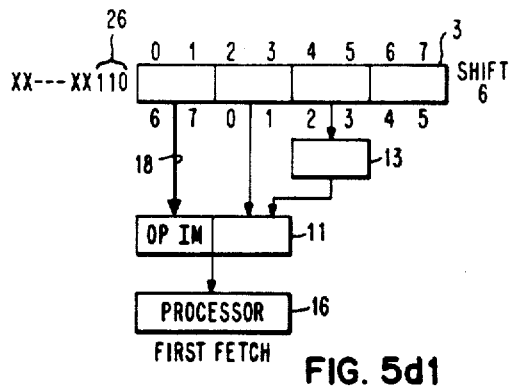
FIG. 5d1
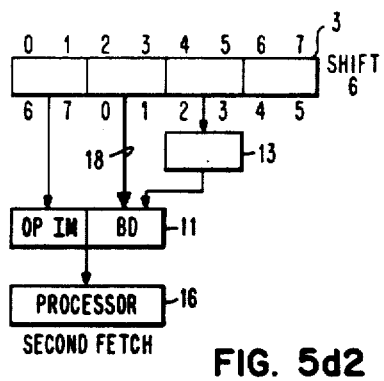
FIG. 5d2

INSTRUCTION BUFFER BYPASS APPARATUS

BACKGROUND OF THE INVENTION

1. Field of the Invention

The subject matter of the present invention pertains to a computer system, and more particularly, to a bypass path in a computer system for bypassing an instruction buffer when certain specific instructions are being executed.

2. Description of the Prior Art

Prior art computer systems, such as that shown in U.S. Pat. No. 3,949,379, execute instructions in a predetermined sequence. In such systems, an instruction to be executed is stored in an instruction register. An instruction buffer is connected to the instruction register for storing a next instruction to be executed in the sequence. When execution of the instruction is complete, the next instruction in the sequence, stored in the instruction buffer, is transferred to the instruction register, whereby execution of the next instruction commences. When execution of the next instruction begins, a further instruction in the sequence is stored in the instruction buffer.

However, certain special instructions, such as an EXECUTE instruction, may appear in the sequence. When a special instruction in the sequence is transferred to the instruction register for execution, another instruction, herein referred to as a "subject instruction", is taken out-of-sequence from the central storage facility and is transferred to the instruction register via the instruction buffer for execution. Since the "subject instruction" is transferred to the instruction register via the instruction buffer, the previous contents of the instruction buffer are destroyed. The previous contents of the instruction buffer include the next instruction to be executed in the sequence following execution of the special instruction.

Since the previous contents of the instruction buffer were destroyed, the predetermined sequence of instructions to be executed by the computer system was disrupted. Therefore, it was necessary to re-initialize the instruction buffer, that is, to fetch the next instruction in the sequence from storage and re-store it in the instruction buffer. This re-initialization consumes time and resources.

In addition, there are instances in which the byte-length of the instruction register is smaller than the byte-length of the instruction to be stored in the instruction register for execution.

The prior art, such as U.S. Pat. Nos. 4,268,907, 4,189,770, and IBM Technical Disclosure Bulletin Vol. 23, No. 12, May 1981, pp. 5329-5331 discloses various types of buffer bypass circuitry. However, this prior art fails to disclose, teach, or suggest the invention disclosed in this application, whereby the contents of the instruction buffer, containing the next instruction to be executed in the sequence, are preserved during execution of certain special instructions, such as the EXECUTE instruction.

SUMMARY OF THE INVENTION

A primary object of the present invention involves the elimination of the disadvantages associated with the computer system of the prior art, especially with regard to elimination of the disadvantage involving re-initialization of the instruction buffer associated with said computer system.

Another object of the present invention includes the provision of an additional register to store one or more bytes of the instruction to be executed when the byte-length of said instruction is larger than the byte-length of the instruction register.

These and other objects of the present invention are accomplished by creating a bypass path for bypassing the instruction buffer when certain special instructions are executed, such as the EXECUTE instruction, thereby transferring the "subject instruction" from storage to the instruction register via the bypass path in lieu of the instruction buffer. As a result, the previous contents of the instruction buffer, comprising the next instruction to be executed in the sequence, are preserved for execution following execution of the special instruction. Furthermore, an execute register is provided for storing one or more bytes of the subject instruction to be executed when all of the bytes of said instruction cannot be stored in the instruction register.

Further scope of applicability of the present invention will become apparent from the description given hereinafter. However, it should be understood that the details of the description and the specific examples while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

A full understanding of the present invention will be obtained from the detailed description given hereinbelow and the accompanying drawings, which are given by way of illustration only, and thus are not limitative of the present invention, and wherein:

FIGS. 3a through 3f illustrate a portion of a prior art computer system whereby the execution of the special instruction occurs without the utilization of the bypass path of FIG. 1;

FIGS. 4a through 4d illustrate a portion of the computer system of the present invention, whereby the execution of the special instruction occurs while utilizing the bypass path of FIG. 1;

FIGS. 5a through 5d illustrate the basic block diagram of FIG. 1 and emphasize the function performed by the execute register representing another feature of the present invention, whereby the byte-length of the instruction register is greater than or equal to the byte-length of the instruction to be executed;

DESCRIPTION OF THE PREFERRED EMBODIMENT

Figure 1:
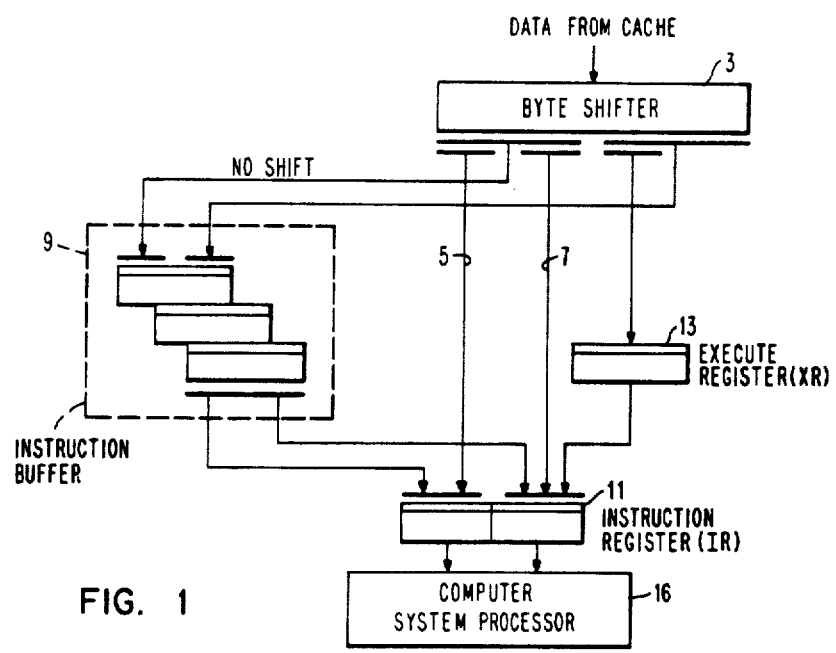
FIG. 1 illustrates a basic block diagram of a portion of a computer system including an instruction buffer, an instruction register, an execute register, and a bypass path representing one feature of the present invention.

Referring to FIG. 1, a basic block diagram of a portion of a computer system is illustrated. In FIG. 1, a byte shifter 3 receives instructions from a central storage facility within the computer system and aligns the instructions during their transfer through the byte shifter. An instruction buffer 9 is connected to the byte shifter 3 for receiving and temporarily storing instructions from the byte shifter 3. An instruction register 11 is connected to the instruction buffer 9 and to the byte shifter 3 via busses 5 and 7 for receiving and storing for execution the instruction stored in the instruction buffer 9 including the special instruction, and for receiving the "subject instruction" via busses 5 and 7 from the byte shifter 3. An execute register 13 is interconnected between the byte shifter 3 and the instruction register 11 for temporarily storing one or more additional bytes of the instruction to be executed when the byte-length of the instruction is greater than the byte-length of the instruction register 11. A computer system processor 16 is connected to the instruction register 11 for receiving the instruction stored in the register 11 and for executing said instruction.

For further information on a system with which the components of FIG. 1 interface, reference is directed to a manual entitled "IBM Systems/370 Principles of Operation", the manual being obtainable from the International Business Machines, Corp. GA22-7000, the disclosure of which is hereby incorporated herein by reference.

In operation, referring to FIG. 1, a computer system processor 16 executes in sequence a plurality of instructions, each of the instructions being sequentially transferred to the instruction register 11 via the instruction buffer 9 for execution. Under normal circumstances, during execution of an instruction stored in the instruction register, the next instruction to be executed in the sequence is stored in the instruction buffer 9. When execution of the instruction is complete, the next instruction in sequence is retrieved from the instruction buffer 9, and is stored in the instruction register 11 for execution. If the next instruction in the sequence is a special instruction, such as an EXECUTE instruction, when the special instruction is executed, another instruction, referred to herein as a "subject instruction", is retrieved from the processor's central storage facility. The subject instruction is not a member of the plurality of instructions sequentially executed by the computer system processor 16. Therefore, during the sequential execution of the plurality of instructions by the processor 16, when the special instruction is transferred from the instruction buffer 9 to the instruction register 11 for execution, the "subject instruction" is retrieved from the central storage facility, out-of-sequence, is transferred to the instruction register 11, and is executed by the processor 16. When execution of the "subject instruction" is complete, a further instruction in the sequence is transferred to the instruction register 11 for execution.

In the prior art, the "subject instruction" was taken out of sequence and transferred to the instruction register 11 via the instruction buffer 9. As a result of this transfer, the previous contents of the instruction buffer 9 were destroyed. The previous contents of the instruction buffer 9 comprised the next instruction in the sequence to be executed following execution of the subject instruction. Since the previous contents were destroyed, re-initialization of the instruction buffer 9 was necessary—that is, the next instruction in the sequence was again retrieved from the central storage facility and was stored in the instruction buffer 9. This re-initialization consumed time and resources.

According to the present invention, the "subject instruction" is transferred to the instruction register 11 via paths 5 and 7, as shown in FIG. 1. Paths 5 and 7 represent a bypass path, whereby the instruction buffer 9 is bypassed during execution of the special instruction. When the "subject instruction" is retrieved from the processor's central storage facility, in response to execution of the special instruction, it is transferred to the instruction register 11 via the bypass path, that is, paths 5 and 7, in lieu of via the instruction buffer. As a result, the previous contents of the instruction buffer 9, comprising the next instruction in the sequence to be executed, are not lost or destroyed. Following the execution of the subject instruction, the next instruction in the sequence, stored in the instruction buffer 9, is transferred from the buffer 9 to the instruction register 11 for execution. As a result of utilization of the bypass paths 5 and 7, re-initialization of the instruction buffer 9 is not necessary.

Figure 2:
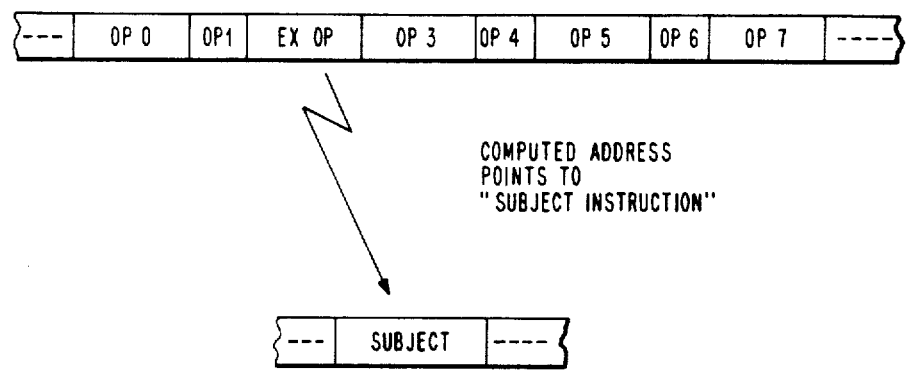
FIG. 2 illustrates a sample special instruction in the sequence as executed by the computer system and a sample "subject instruction" taken out of the sequence and fetched from storage in response to execution of the special instruction, such as said EXECUTE instruction.

Referring to FIG. 2, sample instructions are illustrated. These instructions are intended to be executed in sequence and include op 0, op 1, op 3 through op 7, and the special instruction, namely. the EXECUTE op "Ex op".

In FIG. 2, a "subject instruction" is also illustrated, retrieved from the processor's central storage facility in response to execution of the EXECUTE op shown in FIG. 2.

The sample instructions of FIG. 2 will be utilized in a discussion of FIGS. 3 through 6 of the drawings.

Referring to FIGS. 3a through 3f, a portion of a computer system of the prior art is illustrated representing various steps performed during the execution of the special EXECUTE instruction and the resultant retrieval of the "subject instruction" from the processor's central storage facility. In FIG. 3a, the EXECUTE op is stored in the instruction register 11. The processor 16 executes the EXECUTE op instruction. As a result, the address of the "subject instruction" is calculated. In FIG. 3b, the "subject instruction" is fetched from the central storage facility. In FIGS. 3c and 3d, the "subject instruction" is transferred to the instruction register 11 via the instruction buffer 9. Ops 3, 4, 5, and 6 were previously stored in the instruction buffer 9. As a result, these ops were destroyed the transfer of the "subject instruction" to the instruction register 11 via buffer 9. In FIG. 3e, these ops are re-fetched from the processor's central storage facility and stored in the instruction buffer 9, that is, the instruction buffer 9 is re-initialized. In FIG. 3f, the next instruction in sequence, op 3, stored in the instruction register 11, is executed.

Referring to FIG. 4, a portion of a computer system of the present invention is illustrated representing various steps performed during the execution of the special EXECUTE instruction and the resultant retrieval of the "subject instruction" from the processor's central storage facility. However, in this figure, the bypass path 5 and 7 of FIG. 1 is utilized. In FIG. 4a, a special EXECUTE op is transferred from buffer 9 to instruction register 11 for storage and execution. Ops 3, 4, 5, and 6 are stored in buffer 9 and await execution in sequence. In FIG. 4b, the EXECUTE op is stored in the instruction register 11 for execution. In response to execution of the EXECUTE op instruction, the "subject instruction" is fetched from the processor central storage facility. In FIG. 4c, the "subject instruction" is transferred to and loaded into the instruction register 11 via byte shifter 3 and bypass paths 5 and 7 representing one feature of the present invention. As a result, in FIG. 4d, the next instruction to be executed in sequence, op 3, is transferred from buffer 9 to the instruction register 11 for execution. Therefore, re-initialization of the instruction buffer 9 is not necessary.

An additional feature of the present invention will be described in the paragraphs to follow.

As previously mentioned, there are instances in which the byte-length of the instruction to be executed is greater than the byte-length of the instruction register 11 which stores said instruction. One or more additional bytes of the instruction cannot be loaded into the instruction register 11 for storage. In order to accommodate the one or more additional bytes of the instruction, the execute register 13 is connected between the byte shifter 3 and the instruction register 11 for receiving and storing the one or more additional bytes of the instruction to be executed. For example, if the instruction register 11 is four bytes in length, and the instruction to be executed is six bytes in length, the low-order two bytes of the instruction are stored in the execute register 13, and the high-order four bytes of the instruction are stored in the instruction register 11. The high-order four bytes are processed by the processor 16. When processing of the high order four bytes is complete, the low-order two bytes are loaded into the instruction register 11 from the execute register 13 for execution by the processor 16. To further illustrate the utilization of the execute register 13 for receiving and storing the one or more additional bytes of the instruction to be executed, refer to FIGS. 5 and 6 of the drawings.

FIG. 5 illustrates a condition whereby the instruction to be executed, passing through the byte shifter 3 possesses a byte-length which is equal to or less than the byte-length of the instruction register 11. Consequently, the execute register 13 is not utilized. The instruction buffer 9 is not shown in the figure. FIG. 5 also illustrates a concept. That is, the byte shifter 3 comprises a shifting or alignment apparatus for receiving the instructions from the processor's central storage facility, examining the low order bits of the instruction address representing the amount of shift required, and shifting (i.e.—aligning) the instruction a specified amount depending on the examined address bits of the instruction. For example, in FIG. 5a, the instruction address is XX---XX000. The last three low order bits of the instruction address are "000" as indicated by element no 20. As a result, no shifting or alignment of the instruction occurs. In FIG. 5b, the last three low order bits of the instruction address are "010" as indicated by element no. 22. As a result, the instruction is shifted from a position corresponding to byte 2 to a position corresponding to byte 0 as it passes through the byte shifter 3. In FIG. 5c, the last three low three low order bits of the instruction address are "100" as indicated by element no. 24. As a result, the instruction is shifted from a position corresponding to byte 4 to a position corresponding to byte 0 as it passes through the byte shifter 3 (in the figure, the shifting occurs from right to left within the byte shifter).

In FIGS. 5a through 5c, dark lines 18 are shown. These lines are the bypass paths 5 and 7 of FIG. 1. In FIGS. 5a through 5c, the dark lines 18 indicate that one fetch is required to transfer the instruction from the central storage facility to the instruction register 11 via the byte shifter 3. However, in FIGS. 5d1 and 5d2, a dark line is shown in each figure. As a result, in FIG. 5d1, a first fetch is required to transfer a portion of the instruction to the register 11 via byte shifter 3. In FIG. 5d2, a second fetch is required to transfer another portion of the instruction to the register 11 via byte shifter 3. Furthermore, in FIG. 5d, the last three low order bits of the instruction address are "110" as indicated by element no. 26. As a result, both portions of the instruction are shifted from a position corresponding to byte 6 to a position corresponding to byte 0 as they pass through the byte shifter 3.

In FIG. 5, since the byte-length of the instruction to be executed is less than or equal to the byte-length of the instruction register 11, the execute register 13 is not utilized. However, in FIG. 6, the byte-length of the instruction to be executed is greater than the byte-length of the instruction register 11. Therefore, the one or more additional bytes of the instruction are stored in the execute register 13, while the high order bytes of the instruction are stored in the instruction register 11 for execution. When the instruction is being processed, the one or more bytes of the instruction are transferred to the instruction register 11 from the execute register 13 for execution.

In FIG. 6, when the instruction passes through the byte shifter 3 for shifting and alignment, the low order bits of the instruction address are examined. In response thereto, the instruction is shifted, within the byte shifter 3, by a specific amount in the same manner as described above with reference to FIG. 5 of the drawings. For example, in FIG. 6a, the last three bits of the instruction address are "000" as indicated by element no. 28. Therefore, when the instruction passes through the byte shifter 3, no shifting occurs. One or more bytes of the instruction pass to the execute register 13 while the high order bytes pass to the instruction register 11 for execution. Subsequently, the one or more bytes stored in the execute register 13 pass to the instruction register 11 for execution.

Figure 6A:
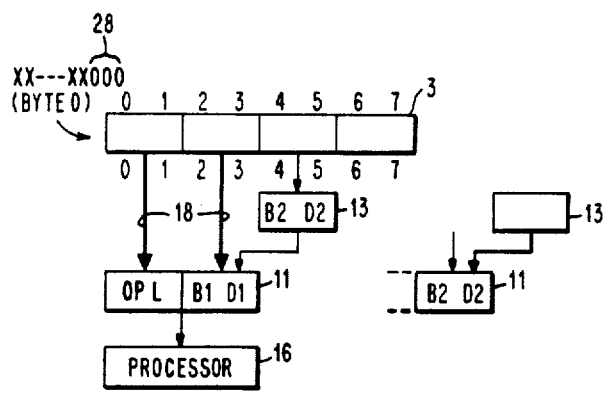
FIGS. 6a through 6d illustrate the basic block diagram of FIG. 1 and emphasize the function performed by the execute register representing another feature of the present invention, whereby the byte-length of the instruction register is less than the byte-length of the instruction to be executed.
Figure 6B:
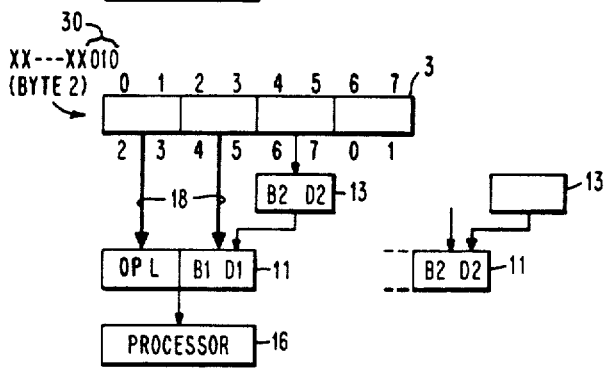

In FIG. 6b, the last three bits of the instruction address are "010" as indicated by element no. 30. As a result, when the instruction passes through the byte shifter 3, it is shifted from a position corresponding to byte 2 to a position corresponding to byte 0. The high order bytes of the instruction are transferred to the instruction register 11 while the low order bytes are transferred to the execute register 13 in the same manner as described with reference to FIG. 6a.

Figure 6C:
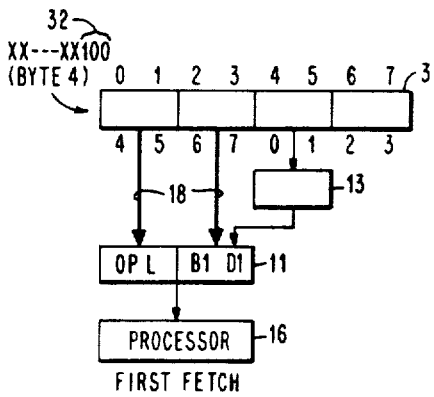
Figure 6C:
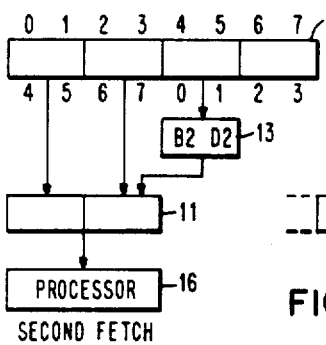

In FIG. 6c, the dark lines 18 indicate the transfer of instruction bytes. Utilizing the dark lines to interpret FIG. 6c, since the last three bits of the instruction address are "100" as indicated by element no. 32, during a first fetch of the high order bytes of the instruction, said high order bytes are shifted from a position. corresponding to byte 4 to a position corresponding to byte 0 as they pass through the byte shifter 3. The high order bytes are stored within the instruction register 11. During a second fetch of the low order bytes of the instruction, since the last three bits of the instruction address are "100", said low order bytes are shifted from a position corresponding to byte 4 to a position corresponding to byte 0 as they pass through the byte shifter 3. The low order bytes are stored within the execute register 13.

Figure 6D:
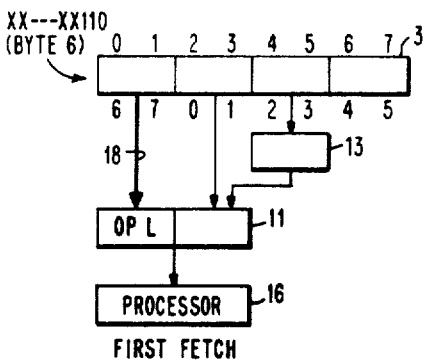
Figure 6D:
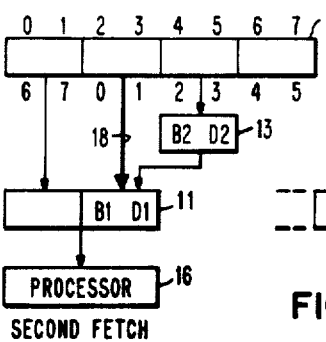

In FIG. 6d, the last three bits of the instruction address "110" indicate that the instruction is shifted from a position corresponding to byte 6 to a position corresponding to byte 0. As the dark lines 18 of FIG. 6d indicate, a first half of the high order bytes are transferred to the instruction register 11 during a first fetch. During a second fetch, a second half of the high order bytes are transferred to the instruction register 11. One or more additional low order bytes of the instruction are transferred to and stored in the execute register 13. Thereafter, the one or more additional low order bytes are transferred to the instruction register 11 from the execute register 13 for execution by the processor 16.

Figure 7:
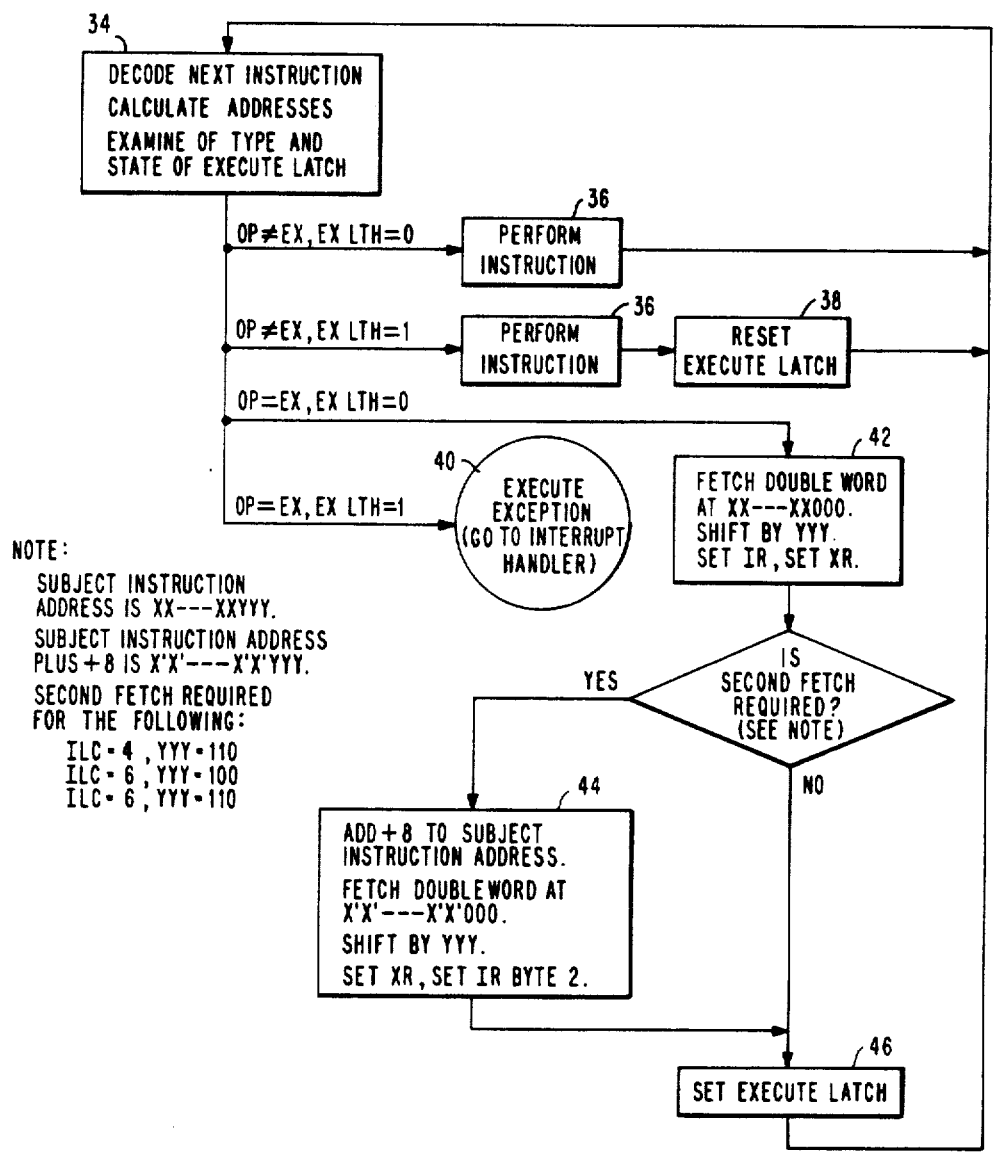
FIG. 7 illustrates a flow chart depicting the operation of the block diagram shown in FIG. 1 of the drawings

FIG. 7 illustrates an instruction processing flow chart depicting the manner by which instructions are processed utilizing the block diagram shown in FIGS. 1 and 4 through 6 of the drawings. In FIG. 7, assume that an instruction to be executed possesses the following address: XX---XXYYY. If a second fetch of another portion of the instruction is required, assume that the address of the other portion of the instruction is: XX---XXYYY+(+8)=X'X'---X'X'YYY. In FIG. 7, block 34 indicates that the instruction is decoded, addresses are calculated, the op-type of the instruction is determined, and the state of an execute latch is determined. the execute latch is set to "1" when the instruction being executed is an EXECUTE instruction. When the instruction being executed is a subject instruction of an execute instruction, the state of the execute latch will therefore be a "1". If the instruction being executed is not a subject instruction of an EXECUTE instruction, the state of the execute latch will be a "0". As indicated by block 36, if the instruction being decoded is not a subject instruction, the instruction is executed normally. If the instruction being executed is not an EXECUTE instruction and the execute latch is set to "1" (i.e.—the instruction being executed is a subject instruction of an EXECUTE instruction), the latch is reset, as indicated by block 38, and the next instruction is decoded for execution. If the instruction previously decoded was an EXECUTE instruction, but the subject instruction is not another EXECUTE instruction, the subject instruction is retrieved at address XX---XX000. When the subject instruction passes through the byte shifter 3, it is shifted or aligned by an amount corresponding to YYY. The instruction register 11 is set and the execute register 13 is set, as indicated by block 42 in FIG. 7. If a second fetch of the target instruction is required, the second portion of the instruction is retrieved at address X'X'----X'X'000. The second portion of the instruction is shifted by an amount corresponding to YYY. The execute register 13 and the instruction register 11 is set, as indicated by block 44 in FIG. 7. The execute latch is set (block 46) and the next instruction (in this case, the subject instruction) is decoded. However, if a second fetch is not required, the execute latch is set (block 46) and the next instruction (in this case, the subject instruction) is decoded for execution.

If, however, the instruction being decoded is an EXECUTE instruction, and the subject instruction of the EXECUTE is another EXECUTE instruction, an execute exception is initiated, that is, the operation is suppressed, as indicated by block 40.

The invention being thus described, it will be obvious that the same may be varied in many ways. Such variations are not to be regarded as a departure from the spirit and scope of the invention and all such modifications as would be obvious to one skilled in the art are intended to be included within the scope of the following claims.

We claim:

1. In a computer system including a central storage facility for storing a plurality of instructions and at least one special instruction, an instruction buffer connected to the central storage facility for retrieving each of the plurality of instructions and said special instruction in sequence form said storage facility, and an instruction register connected to the instruction buffer for retrieving an instruction from the instruction buffer and holding at least some of the bytes of said instruction therein during execution thereof, the improvement comprising:

bypass path means connected between said central storage facility and said instruction register for bypassing said instruction buffer when the special instruction is held in said instruction register for execution, another instruction being transferred from said central storage facility to said instruction register via said bypass path means during execution of said special instruction thereby bypassng said instruction buffer and preventing the destruction of the contents of said buffer; and execute register means connected between said central storage facility and said instruction register for storing one or more additional bytes of said another instruction during the transfer of said another instruction from said central storage facility to said instruction register via said bypass path means when the byte length of said another instruction is greater than the byte length of said instruction register.

2. In the computer system of claim 1, further comprising:

byte-shifter means interconnecting said instruction buffer and said instruction register to said central storage facility for shifting the bytes of said instruction received from said central storage facility by a predetermined amount prior to the holding of said some of the bytes of said instruction in said instruction register and the storage of said one or more additional bytes in said execute register means, the magnitude of said predetermined amount depending upon the magnitude of a set of bits which comprise at least a portion of the address of said instruction.

3. In the computer system of claim 2, wherein said bypass path means comprises an instruction transfer path connecting said byte shifter means to said instruction register and bypassing said instruction buffer, said instruction transfer path being enabled when said special instruction is stored in said instruction register for execution.

4. A computer system, comprising:
a central storage facility for storing a plurality of instructions to be executed;
register means for holding one of said instructions therein for execution;
processor means connected to said register means for receiving and executing the one instruction stored in said register means;
buffer means interconnected between said central storage facility and said register means for storing a next instruction of a sequence of instructions, said register means receiving and holding said next instruction when execution of said one instruction by said processor means is complete;

bypass means connecting said central storage facility to said register means by passing said buffer means when a special instruction in said sequence of instructions is held in said register means for execution by said processor means, another instruction not a part of said sequence being retrieved from said central storage facility and transferred to said register means via said bypass means thereby preserving the contents of said buffer means; and execute register means interconnected between said central storage facility and said register means for storing one or more bytes of said another instruction during the transfer of said another instruction from said central storage facility to said register means via said bypass means thereby permitting the storage of the remaining bytes of said another instruction in said register means when the byte length of said another instruction is greater than the byte length of said register means.

* * * * *